(12) United States Patent
Nagura et al.

(10) Patent No.: US 9,056,566 B2
(45) Date of Patent: Jun. 16, 2015

(54) VEHICLE SEAT RECLINING APPARATUS

(71) Applicant: AISIN SEIKI KABUSHIKI KAISHA, Kariya (JP)

(72) Inventors: Mikihito Nagura, Okazaki (JP); Akihiro Chiba, Anjo (JP); Naoaki Hoshihara, Obu (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 180 days.

(21) Appl. No.: 13/740,608

(22) Filed: Jan. 14, 2013

(65) Prior Publication Data

US 2013/0187426 A1 Jul. 25, 2013

(30) Foreign Application Priority Data

Jan. 19, 2012 (JP) ................................. 2012-009316

(51) Int. Cl.
*B60N 2/235* (2006.01)
(52) U.S. Cl.
CPC .................................... *B60N 2/2356* (2013.01)
(58) Field of Classification Search
CPC .................................................... B60N 2/2356
USPC ................................ 297/367 P, 367 R, 367 L
See application file for complete search history.

(56) References Cited

U.S. PATENT DOCUMENTS

| 4,401,344 | A | * | 8/1983 | Chihara et al. ............. 297/367 R |
| 5,678,895 | A | * | 10/1997 | Matsuura et al. ......... 297/367 R |
| 5,685,610 | A | * | 11/1997 | Minai ............................ 297/364 |
| 5,785,386 | A | * | 7/1998 | Yoshida .................... 297/367 R |
| 5,813,725 | A | * | 9/1998 | Robinson .................. 297/367 R |
| 5,873,630 | A | * | 2/1999 | Yoshida et al. ............ 297/367 R |
| 6,019,430 | A | * | 2/2000 | Magyar et al. ............ 297/367 R |
| 6,474,740 | B1 | * | 11/2002 | Kondo et al. ............. 297/367 R |
| 7,086,698 | B2 | * | 8/2006 | Shiraki ...................... 297/367 R |
| 7,188,905 | B2 | * | 3/2007 | Ham ......................... 297/367 R |
| 7,461,899 | B2 | * | 12/2008 | Seibold ..................... 297/367 R |
| 7,552,971 | B1 | * | 6/2009 | Tarusawa et al. .......... 297/367 P |
| 7,648,204 | B2 | * | 1/2010 | Oki ........................... 297/367 L |
| 7,703,852 | B2 | * | 4/2010 | Wahls et al. .............. 297/367 R |
| 7,810,886 | B2 | * | 10/2010 | Nagura et al. ................. 297/366 |
| 7,950,741 | B2 | * | 5/2011 | Mitsuhashi ................... 297/362 |
| 7,992,938 | B2 | * | 8/2011 | Kojima et al. ............ 297/354.12 |
| 8,002,353 | B2 | * | 8/2011 | Yamada et al. ............... 297/366 |
| 8,128,170 | B2 | * | 3/2012 | Cha et al. .................. 297/367 P |
| 8,251,451 | B2 | * | 8/2012 | Dziedzic ................... 297/367 P |
| 8,267,476 | B2 | * | 9/2012 | Kumazaki et al. ......... 297/367 P |
| 8,430,453 | B2 | * | 4/2013 | Fujishiro et al. ........... 297/367 P |
| 8,430,454 | B2 | * | 4/2013 | Tanguy et al. ............. 297/367 L |
| 8,459,743 | B2 | * | 6/2013 | Villarroel .................. 297/367 P |
| 8,616,649 | B2 | * | 12/2013 | Uramichi et al. .......... 297/367 P |
| 8,651,578 | B2 | * | 2/2014 | Yamada et al. ............ 297/367 P |
| 8,668,269 | B2 | * | 3/2014 | Jaudouin et al. ........... 297/367 P |
| 2005/0067872 | A1 | * | 3/2005 | Jeong ............................. 297/367 |

(Continued)

FOREIGN PATENT DOCUMENTS

| JP | 2007-325772 | 12/2007 |
| JP | 2009-95432 | 5/2009 |

*Primary Examiner* — David R Dunn
*Assistant Examiner* — Alexander Harrison
(74) *Attorney, Agent, or Firm* — Oblon, McClelland, Maier & Neustadt, L.L.P.

(57) ABSTRACT

Provided is a vehicle seat reclining apparatus comprising: a first bracket, a second bracket, a pole, a cam, a locking urging member, a hinge pin, a fitting hole, a release lever, and a supporting urging member.

6 Claims, 8 Drawing Sheets

(56) References Cited

U.S. PATENT DOCUMENTS

| | | | |
|---|---|---|---|
| 2006/0091712 A1* | 5/2006 | Tokui et al. | 297/367 |
| 2007/0096530 A1* | 5/2007 | Ohba et al. | 297/367 |
| 2008/0030061 A1* | 2/2008 | Pejathaya | 297/367 |
| 2008/0169695 A1* | 7/2008 | Hahn et al. | 297/367 |
| 2008/0185892 A1* | 8/2008 | Peters et al. | 297/362 |
| 2009/0096269 A1 | 4/2009 | Kojima et al. | |
| 2009/0243363 A1* | 10/2009 | Tarusawa et al. | 297/367 P |
| 2009/0250989 A1* | 10/2009 | Endo et al. | 297/367 P |
| 2011/0001346 A1* | 1/2011 | Yamada et al. | 297/367 P |
| 2011/0012414 A1* | 1/2011 | Yamada et al. | 297/367 P |
| 2011/0025114 A1* | 2/2011 | Berndtson et al. | 297/367 P |
| 2011/0115271 A1* | 5/2011 | Yamada et al. | 297/367 P |
| 2012/0169105 A1* | 7/2012 | Assmann et al. | 297/367 P |
| 2013/0154331 A1* | 6/2013 | Ito | 297/367 P |
| 2013/0161994 A1* | 6/2013 | Ito | 297/367 P |

* cited by examiner

42: CAM
66: FITTING HOLE
66a: INNER SIDE SURFACE
70: HINGE PIN
71: FITTING SHAFT PORTION
71a: FLAT SURFACE

VEHICLE SEAT RECLINING APPARATUS

CROSS REFERENCE TO RELATED APPLICATIONS

This application is based on and claims priority under 35 U.S.C. §119 to Japanese Patent Application No. 2012-009316, filed on Jan. 19, 2012, the entire content of which is incorporated herein by reference.

TECHNICAL FIELD

This disclosure relates to a vehicle sheet reclining apparatus for adjusting an angle of inclination of a seatback with respect to a seat cushion.

BACKGROUND DISCUSSION

In the related art, a vehicle seat reclining apparatus described in JP 2009-95432A (Reference 1) is known as such a vehicle seat reclining apparatus. As shown in FIG. 8, the vehicle seat reclining apparatus includes a gear arm 101 having inner teeth 101a, a support arm 102 supported by the gear arm 101, poles 103 whose movement in the radial direction is guided by guide portions 102a provided on the support arm 102, a cam 104 engaging the poles 103, and a locking spring 105 configured to urge the cam 104 to rotate.

The cam 104 includes a hinge pin 106 fitted thereto. In other words, so-called an oval shaped engaging hole 104a having two inner side surfaces parallel to each other is formed at a center portion of the cam 104. In contrast, the hinge pin 106 is formed with a shaft portion 106a whose column-shaped outer peripheral portion is chamfered along two flat surfaces parallel to each other. The hinge pin 106 penetrating through the engaging hole 104a of the cam 104 is configured to engage the engaging hole 104a of the cam 104 in two chamfered portions of the shaft portion 106a (hereinafter, referred to also as "width cross flat"). Then, the shaft portion 106a of the hinge pin 106 is provided with an operating lever (not illustrated) integrally attached thereto.

In such a configuration, if the poles 103 guided by the support arm 102 (the guide portions 102a) are advanced in the radial direction by the rotation of the cam 104 urged to rotate by the locking spring 105, the inner teeth 101a of the gear arm 101 and outer teeth 103a of the poles 103 engage, so that the rotation of the gear arm 101 with respect to the support arm 102 is restricted. Alternatively, if the poles 103 guided by the support arm 102 (the guide portions 102a) are retracted in the radial direction by the rotation of the cam 104 via the hinge pin 106 in association with a release operation of the operating lever, the inner teeth 101a of the gear arm 101 and the outer teeth 103a of the poles 103 are released, so that the rotation of the gear arm 101 with respect to the support arm 102 is allowed. With the configuration described thus far, the rotation of the seatback with respect to the seat cushion is restricted or allowed to adjust and maintain the seatback to a required angle of inclination suitable for seating of a passenger.

In JP 2009-95432A (Reference 1), the shaft portion 106a of the hinge pin 106 penetrates through the engaging hole 104a with a gap formed with respect to the engaging hole 104a of the cam 104. It is for absorbing inclination of an axial line of the hinge pin 106 if any by the gap formed with respect to the engaging hole 104a and preventing an axial line of the cam 104 from inclining together with the hinge pin 106. Accordingly, the rotation of the cam 104 and advancement and retraction of the poles 103 associating therewith are smoothened, and an operation when restricting or allowing the rotation of the gear arm 101 with respect to the support arm 102, that is, an operation when restricting or allowing the rotation of the seatback with respect to the seat cushion is further stabilized.

However, in this case, there arises a circumferential play in the circumferential direction between the width across flat of the shaft portion 106a relating to the transmission of rotation between the hinge pin 106 and the cam 104 and both of the inner side surfaces of the engaging hole 104a parallel to each other. Therefore, a remarkable lag (that is, an operation loss) is generated between rotation start timing of the hinge pin 106 in association with the release operation of the operation lever and timing of a release of engagement between the inner teeth 101a of the gear arm 101 and the outer teeth 103a of the poles 103 in association with the rotation of the cam 104, whereby operation feeling may be degraded.

A need thus exists for a vehicle seat reclining apparatus which is not susceptible to the drawback mentioned above.

SUMMARY

In order to solve the above-described problems, according to a first aspect of the embodiment disclosed here, there is provided a vehicle seat reclining apparatus comprising: a first bracket to be fixed to either one of a seat cushion side and a seatback side; a second bracket fixed to the other one of the seat cushion side and the seatback side, and configured to allow adjustment of an angle of inclination of the seatback with respect to the seat cushion in association with a relative rotation with respect to the first bracket; a pole having outer teeth engageable and disengageable with respect to inner teeth provided on the second bracket and configured to be guided by a guide wall provided on the first bracket so as to move in the radial direction thereof; a cam engaged with the pole and rotatably provided on the first bracket; a locking urging member configured to urge the cam to rotate to cause the outer teeth and the inner teeth to be engaged each other; a hinge pin having a fitting shaft portion including two flat surfaces facing each other in the radial direction with respect to an axial line at the center of the first and second brackets and parallel to each other and being axially supported by the second bracket; and a fitting hole formed at a center portion of the cam, having two inner side surfaces parallel to each other and facing the two flat surfaces of the fitting shaft portion in the radial direction with respect to the axial line at the center, and allowing insertion of the fitting shaft portion, the fitting hole being set to have a smaller gap with respect to the fitting shaft portion in one of a radial direction in which the two flat surfaces face each other and a radial direction orthogonal to the radial direction in which the two flat surfaces face each other than a gap between the fitting shaft portion and the fitting hole in the other one of the two radial directions; a release lever coupled to the hinge pin so as to rotate integrally therewith; and a supporting urging member locked to the release lever at one leg portion thereof and locked to the seat cushion side or the seatback side where the first bracket is fixed at the other leg portion, and configured to urge the release lever along the radial direction on the side having the larger gap between the fitting shaft portion and the fitting hole.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment disclosed here will be explained with reference to the attached drawings.

Figure 1:
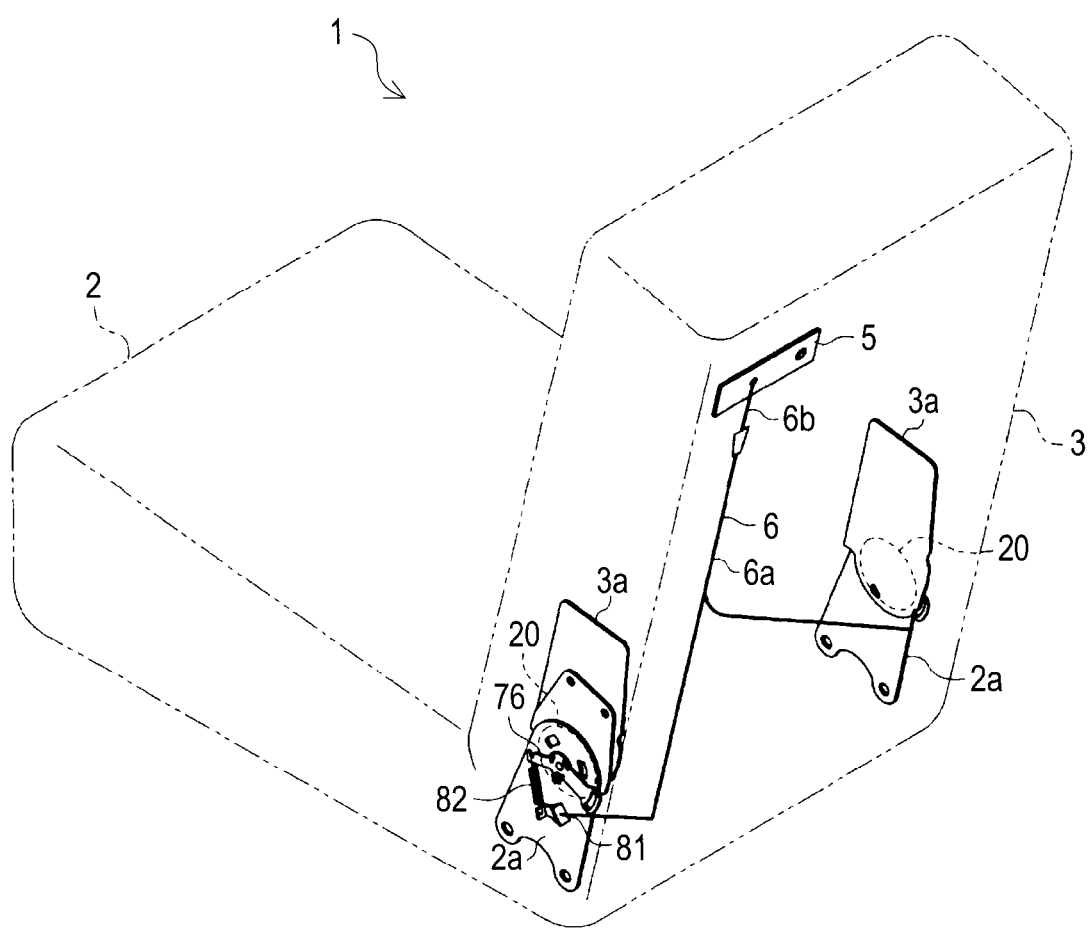
FIG. 1 is a perspective view of a seat according to an embodiment disclosed here.

Referring now to FIG. 1 to FIG. 6, an embodiment disclosed here will be described. As illustrated in FIG. 1, a seat 1 which forms a seating portion for a passenger is installed on a vehicle floor. The seat 1 includes a seat cushion 2 which forms a seating surface and a seatback 3 supported by a rear end portion of the seat cushion 2 so as to allow a tilting movement (rotation) thereof. In other words, a pair of seat cushion side frames 2a formed of metallic plates which serve as main frames of both rear end portions on both sides of the seat cushion 2 include a pair of seatback side frames 3a formed of metallic plates which serve as main frames of both lower end portions on both sides of the seatback 3 coupled thereto respectively via substantially disk-shaped recliners 20. An angle of inclination of the both seatback side frames 3a with respect to the both seat cushion side frames 2a, that is, an angle of inclination of the seatback 3 with respect to the seat cushion 2 is configured to be adjusted and held at predetermined multiple angles by the both recliners 20 disposed on the seat on both sides in the width direction. Accordingly, a person sitting on the seat 1 is capable of adjusting a position of eyes according to his or her physical structure, for example. Alternatively, the person sitting on the seat 1 is capable of adjusting a seating posture depending on comfortableness that he or she requires, for example.

Subsequently, the recliner 20 will be described.

Figure 2:
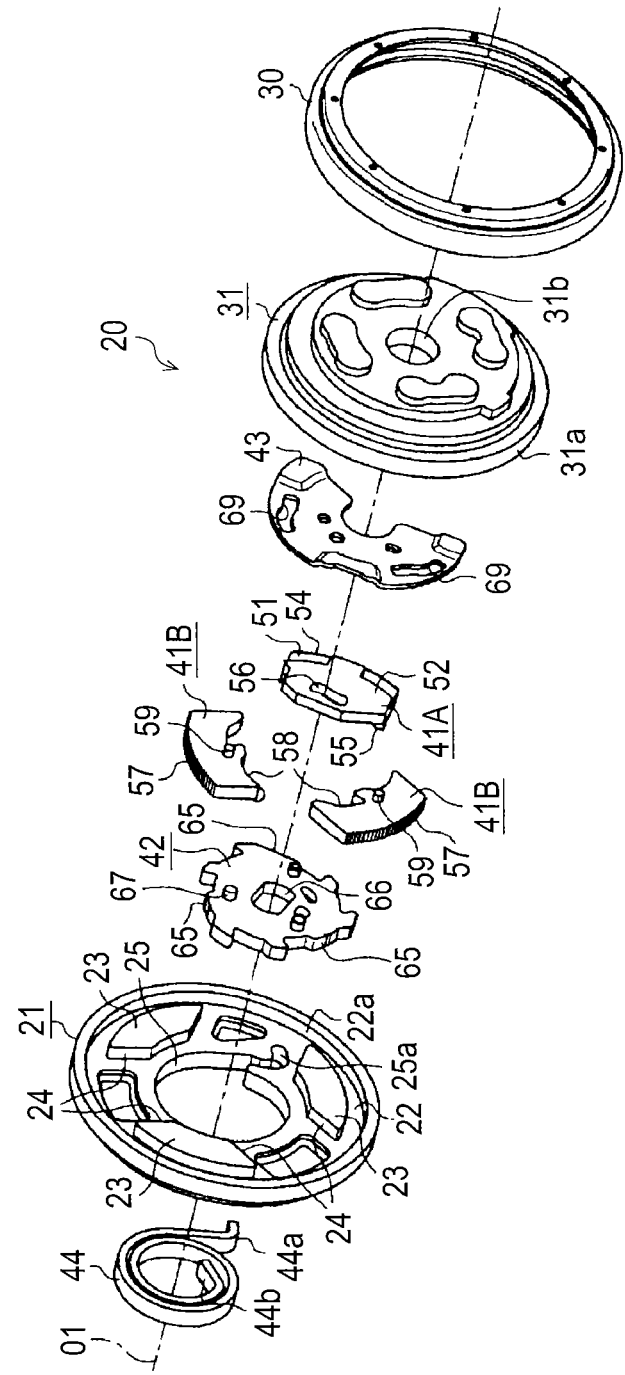
FIG. 2 is an exploded perspective view according to an embodiment disclosed here.

As illustrated in FIG. 2, the recliner 20 includes a disk-shaped first bracket 21 and a second bracket 31 having a centerline (axial line) O1 extending in the seat width direction. The first bracket 21 is fixed, for example to the seat cushion side frame 2a (on the side of the seat cushion 2) and the second bracket 31 is fixed to the seatback side frame 3a (on the side of the seatback 3).

The first bracket 21 is formed by half blanking of a metallic plate for example, and includes a circular depression 22 opening toward the second bracket 31. The depression 22 has an inner peripheral surface 22a about the centerline (axial line) O1.

Three substantially fan-shaped projections 23 are arranged in the depression 22 of the first bracket 21 at equiangular intervals on the circumference thereof. Each of the projections 23 forms guide walls 24 on circumferentially both sides. The guide walls 24 of the adjacent projections 23 facing in the circumferential direction extend in the radial direction with respect to the centerline O1 at the center parallel to each other.

Figure 3:
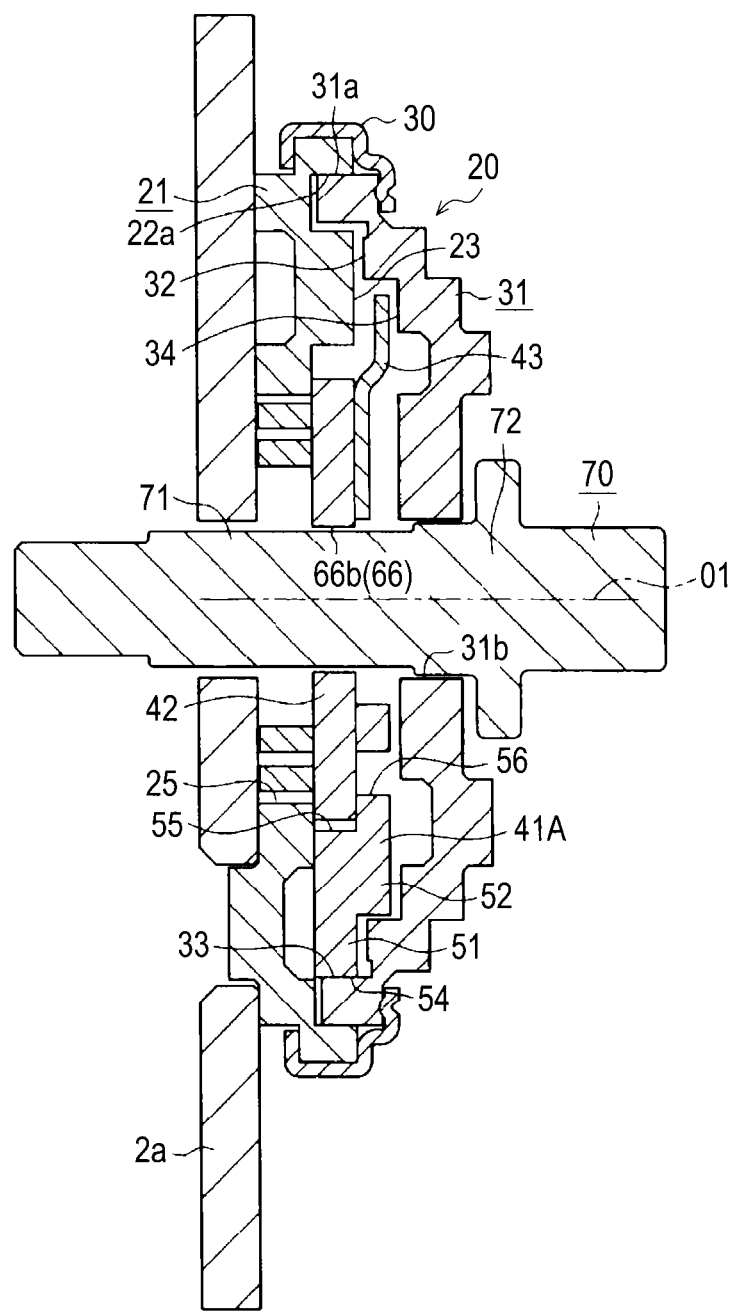
FIG. 3 is a vertical cross-sectional view of the same embodiment.

A substantially circular through hole 25 is formed at a center portion of the first bracket 21. The through hole 25 includes a locking hole 25a formed so as to be depressed on the radially outside at a predetermined angular portion. The second bracket 31 is formed by half blanking of a metallic plate for example, and includes an outer peripheral surface 31a having an outer diameter substantially the same as an inner diameter of the inner peripheral surface 22a of the first bracket 21. A circular through hole 31b is formed at a center portion of the second bracket 31. In addition, the second bracket 31 includes a substantially circular depression 32 opening toward the first bracket 21 as illustrated in FIG. 3. The depression 32 is formed on the inner peripheral surface thereof with inner teeth 33 having a center at the centerline O1 over the entire circumference.

The second bracket 31 is fitted so that the outer peripheral surface 31a comes into sliding contact with the inner peripheral surface 22a of the first bracket 21. A ring-shaped holding member 30 formed of a metallic plate is mounted on outer peripheral portions of the first bracket 21 and the second bracket 31 in a state in which the inner peripheral surface 22a of the first bracket 21 and the outer peripheral surface 31a of the second bracket 31 are fitted to each other. The first bracket 21 and the second bracket 31 are retained by the holding member 30 so as not to come apart in the axial direction in a state in which a relative rotation is allowed.

As illustrated in FIG. 2, a first pole 41A, a pair of second poles 41B, a cam 42, a release plate 43, and a helical spring 44 as a locking urging member are disposed between the first bracket 21 and the second bracket 31.

The first and second poles 41A and 41B are mounted between the adjacent two guide walls 24 and are arranged at equiangular intervals on the circumference about the centerline O1.

The first pole 41A includes a first block 51 and a second block 52 formed by, for example, forging a steel material to have a level difference from each other. The first block 51 and the second block 52 of the first pole 41A are arranged on the side of the inner teeth 33 of the second bracket 31 and on the side of the centerline O1, respectively.

The first block 51 is formed with outer teeth 54 which are engageable with the inner teeth 33 of the second bracket 31 on an outer end of an arcuate shape thereof (an end surface facing the inner teeth 33 of the second bracket 31), and is formed with an inner cam portion 55 engaging an outer peripheral portion of the cam 42 on an inner end thereof (a back surface, which corresponds to an end surface facing opposite from the outer end). In contrast, a pole-side groove cam portion 56 penetrating through the second block 52 in the thickness direction is formed at a substantially center portion thereof.

The first pole 41A is guided to move in the radial direction with respect to the centerline O1 at the center with the both end portions thereof in the width direction in sliding contact with the both guide walls 24. The first pole 41A engages or releases the engagement of (engages and disengages) the outer teeth 54 and the inner teeth 33 by advancing and retracting along the radial direction along the both guide walls 24.

The second poles 41B are each manufactured by pressing a steel plate or the like and cutting the second block 52 of the first pole 41A, thereby having a flat plate shape similar to a shape composed only of the first block 51 and having no level difference. The second poles 41B are each formed with outer teeth 57 which are engageable with the inner teeth 33 of the second bracket 31 on an outer end of an arcuate shape thereof (an end surface facing the inner teeth 33 of the second bracket 31), and with an inner cam portion 58 engaging the outer peripheral portion of the cam 42 on an inner end thereof (a back surface, which corresponds to an end surface facing opposite from the outer end). In addition, the second poles 41B are formed with an engaging projection 59 at a center portion in the width direction so as to project therefrom.

The second poles 41B are allowed to move in the radial direction with respect to the centerline O1 at the center with the both end portions thereof in the width direction in sliding contact with the both guide walls 24. The second poles 42B engage or release the engagement of (engage and disengage) the outer teeth 57 and the inner teeth 33 by advancing and retracting along the radial direction along the both guide walls 24.

The cam 42 is arranged on the centerline O1 so as to be rotatable on the centerline O1 inside the depression 32 of the second bracket 31, that is, on an inner peripheral side of the first and second poles 41A and 41B. The cam 42 is manufactured by pressing a steel plate or the like and has a flat plate shape having no level difference. The cam 42 has three sets of cam surfaces 65 on the circumference of the outer peripheral portion at equiangular intervals. A substantially oval-shaped fitting hole 66 is formed at a center portion of the cam 42.

The respective cam surfaces 65 are capable of coming into abutment with the facing inner cam portions 55 and 58 of the first and second poles 41A and 41B and press the inner cam portions 55 and 58 when the cam 42 is rotated in a locking direction (hereinafter, referred to also as "direction of rotation for locking").

In contrast, when the cam 42 is rotated in a direction of releasing the lock (hereinafter, referred to also as "direction of rotation for unlocking"), the respective cam surfaces 65 move apart from the inner cam portions 55 and 58 of the first and second poles 41A and 41B.

A side surface of the cam 42 is formed with a plurality of engaging projections 67 at intervals on the circumference thereof, and one of the engaging projections 67 is inserted and engaged with the pole-side groove cam portion 56 of the first pole 41A. The pole-side groove cam portion 56 and the engaging projections 67 act on the first pole 41A so that the first pole 41A moves radially inwardly by the rotation of the cam 42 in the direction of rotation for unlocking.

The substantially semi-circular thin-plate shaped release plate 43 is integrally mounted on the side surface of the cam 42 by being engaged with the engaging projections 67. The release plate 43 is mounted on the cam 42 so as to be aligned with the second block 52 of the first pole 41A in the axial direction, and is in contact with end surfaces of the both second poles 41B so as to allow sliding contact therewith. Accordingly, both of the second poles 41B and the release plate 43 are accommodated within a range of the thickness of the first pole 41A. For reference, by opening an angular range corresponding to the first pole 41A, the release plate 43 is avoided from interfering with the first pole 41A by the integral rotation of the release plate 43 with the cam 42.

The release plate 43 is formed with two release-plate-side groove cam portions 69 penetrating in the thickness direction. The engaging projections 59 formed on both of the two second poles 41B are inserted and engaged with the release-plate-side groove cam portions 69. The release-plate-side groove cam portion 69 and the engaging projections 59 act on the second poles 41B so that the second poles 41B move radially inwardly by the rotation of the cam 42 and the release plate 43 in the direction of rotation for unlocking.

The helical spring 44 is configured to urge the cam 42 to rotate in the direction of engaging the first and second poles 41A and 41B with the second bracket 31 (the direction of rotation for locking), and is housed in the through hole 25 of the first bracket 21. The helical spring 44 is formed by bending a substantially rectangular flat wire material into a predetermined helical shape, and is disposed between the first bracket 21 and the cam 42. In other words, an outer leg portion 44a on the outside of the helical spring 44 is engaged with the locking hole 25a, and an inner leg portion 44b on the inside thereof is engaged with an engaging portion, not illustrated, provided on an end surface of the cam 42.

With an urging force of the helical spring 44, the cam 42 is urged to rotate in the direction of rotation for locking with respect to the first bracket 21, and presses the first and second poles 41A and 41B radially outward by the cam surfaces 65, so that the outer teeth 54 and 57 thereof are engaged with the inner teeth 33 of the second bracket 31.

As illustrated in FIG. 3, each of the recliners 20 includes a hinge pin 70 formed, for example, of a metallic rod, inserted therethrough along the centerline O1. The hinge pin 70 includes a substantially oval column-shaped fitting shaft portion 71 to be fitted and inserted into the fitting hole 66 of the cam 42, and a substantially column shaped shaft portion 72 axially supported by the second bracket 31 (the through hole 31b). For reference, a distal end portion of the fitting shaft portion 71 to be fitted and inserted into the fitting hole 66 of the cam 42 is loosely fitted to the first bracket 21 (the through hole 25) and the seat cushion side frames 2a so as to project outward.

Figure 4:
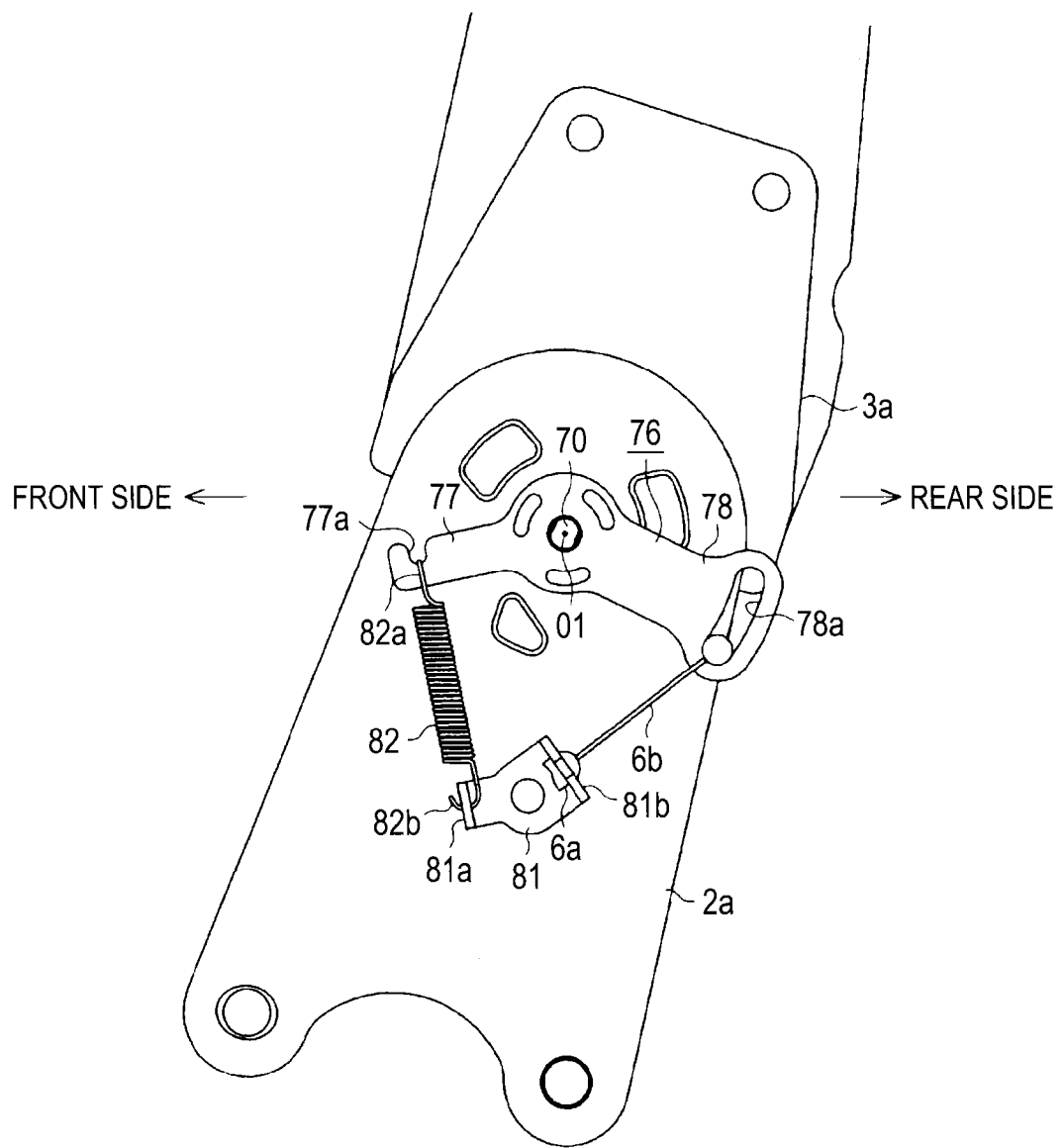
FIG. 4 is a side view of the same embodiment.

A release lever 76 formed of a metallic plate and having an arm shape is coupled to the distal end portion of the fitting shaft portion 71 projecting outward from the seat cushion side frames 2a so as to rotate integrally therewith as illustrated in FIG. 4. The release lever 76 includes a first lever portion 77 and a second lever portion 78 extending respectively radially forward and radially rearward about the centerline O1. A substantially U-shaped engaging groove 77a formed so as to be depressed downward from an upper end is formed at a distal end portion of the first lever portion 77, and a locking hole 78a extending in the circumferential direction about the centerline O1 and having an elongated hole shape is formed at a distal end portion of the second lever portion 78.

A supporting bracket 81 formed, for example, of a metallic plate and having an arm shape is fixed to an outside surface of the seat cushion side frame 2a on a lower side of the release lever 76. The supporting bracket 81 extends in the fore-and-aft direction, and includes a flange-shaped locking strip 81a projecting outward (the near side orthogonal to the paper plane of FIG. 4) at a front end portion thereof. Also, a flange-shaped supporting strip 81b is provided so as to project outward at a rear end portion of the supporting bracket 81 projecting rearward of the seat cushion side frame 2a.

One leg portion 82a and the other leg portion 82b of a tension coil spring 82 having an axial line extending in the vertical direction as a supporting urging member are locked with the engaging groove 77a of the release lever 76 and the locking strip 81a of the supporting bracket 81. The tension coil spring 82 urges the release lever 76 along the radial direction with respect to the centerline O1 at the center on the side having a larger gap between the fitting shaft portion 71 of the hinge pin 70 and the fitting hole 66 of the cam 42. In other words, the urging direction of the tension coil spring 82 is dominant in the radial direction with respect to the centerline O1 at the center on the side having the larger gap between the fitting shaft portion 71 of the hinge pin 70 and the fitting hole 66 of the cam 42.

Figure 5:
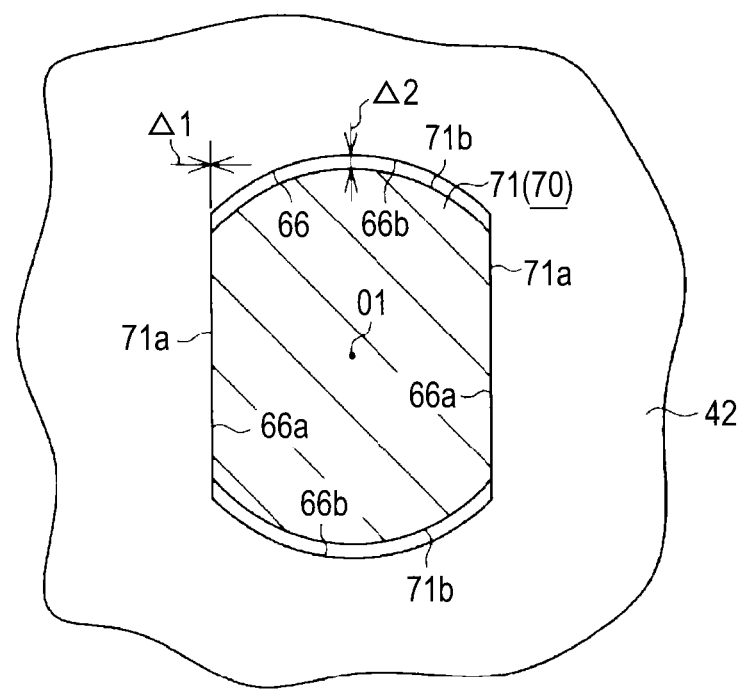
FIG. 5 is an explanatory drawing illustrating a fitting state of a fitting hole and a fitting shaft portion in an enlarged scale.

More specifically, the fitting shaft portion 71 having a substantially oval shape in cross section as illustrated in FIG. 5 is defined by two flat surfaces 71a facing each other in the radial direction with respect to the centerline O1 at the center and extending parallel to each other and a pair of arcuate surfaces 71b also facing each other in the radial direction with respect to the centerline O1 at the center and connecting the two flat surfaces 71a. In contrast, the substantially oval-shaped fitting hole 66 is defined by two inner side surfaces 66a facing the two flat surfaces 71a of the fitting shaft portion 71 in the radial direction with respect to the centerline O1 at the center and extending parallel to each other, and a pair of arcuate surfaces 66b also facing each other in the radial direction with respect to the centerline O1 at the center and coupling the two inner side surfaces 66a. In other words, the radial direction in which the both flat surfaces 71a face each other and the radial direction in which the both arcuate surfaces 71b face each other are orthogonal to each other and the radial direction in which the both inner side surfaces 66a face each other and, in the same manner, the radial direction in which the both arcuate surfaces 66b face each other are orthogonal to each other.

A gap Δ1 with respect to the fitting hole 66 in the radial direction in which the two flat surfaces 71a of the fitting shaft portion 71 face each other (that is, the gap Δ1 between the flat surfaces 71a and the inner side surfaces 66a adjacent to each other in the radial direction) is set to be smaller than a gap Δ2 with respect to the fitting hole 66 in a radial direction orthogonal to the radial direction described above (that is, the gap Δ2 between the arcuate surfaces 71b and 66b adjacent to each other in the radial direction). Therefore, the tension coil spring 82 urges the hinge pin 70 along the radial direction in which the two arcuate surfaces 71b of the fitting shaft portion 71 face via the release lever 76.

Figure 6:
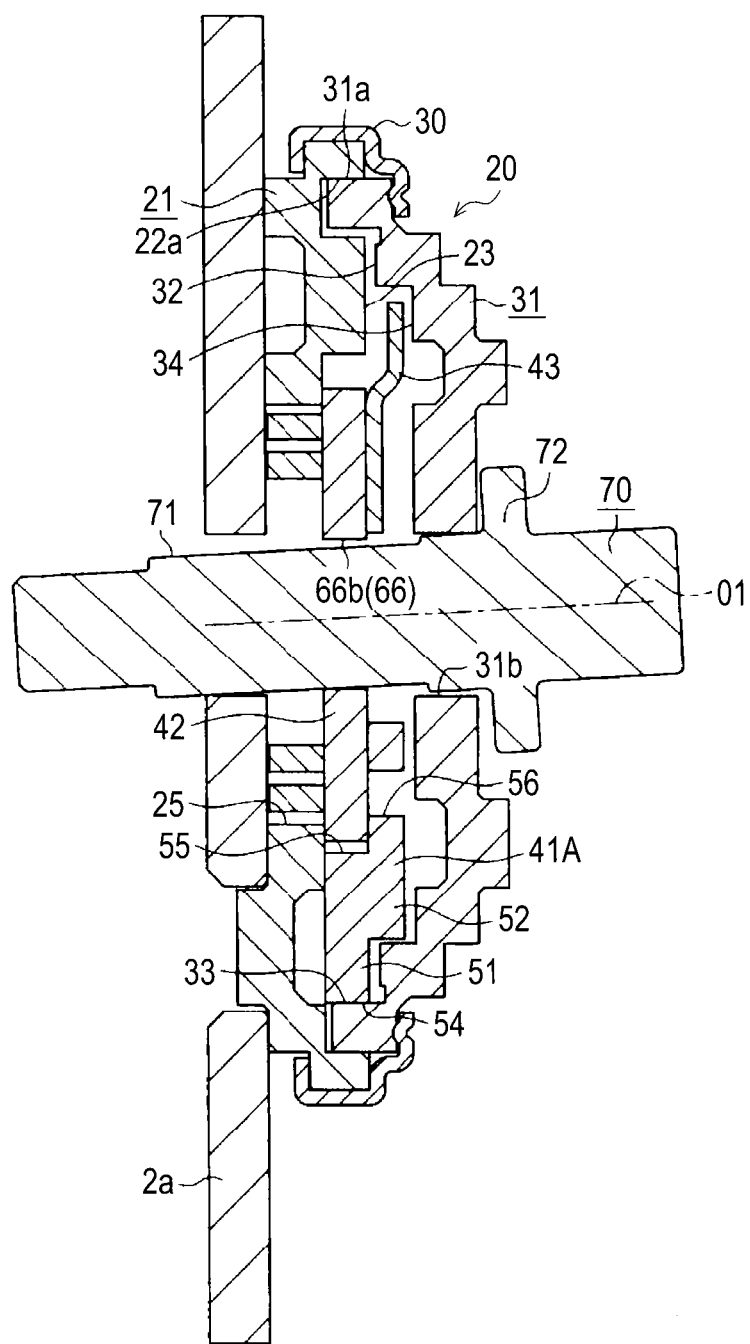
FIG. 6 is a vertical cross-sectional view illustrating an operation of the same embodiment.

As illustrated in FIG. 6, an axial line of the hinge pin 70 urged by the tension coil spring 82 via the release lever 76 is inclined in the radial direction in which the two arcuate surfaces 71b face about an upper portion of the shaft portion 72 axially supported by the second bracket 31 (the through hole 31b) as a pivot point. In this manner, by absorbing the inclination of the axial line of the hinge pin 70 in the radial direction on the side where the gap between the fitting shaft portion 71 and the fitting hole 66 is larger in advance, the axial line of the cam 42 is prevented from being inclined with the hinge pin 70.

Here, when the release lever 76 is rotated together with the hinge pin 70 about the centerline O1 clockwise in FIG. 4, the cam 42 is rotated accordingly. At this time, the direction of rotation of the cam 42 is set so as to agree with the direction of rotation for unlocking. Therefore, the first pole 41A and the both second poles 41B move radially inward by the rotation of the cam 42 and the release plate 43 in the direction of rotation for unlocking and hence the recliner 20 is allowed to rotate freely.

In the embodiment disclosed herein, as illustrated in FIG. 5, in the radial direction in which the two flat surfaces 71a face each other, which corresponds to the radial direction on the side in which the gap between the fitting shaft portion 71 and the fitting hole 66 is smaller, the play of the fitting shaft portion 71 in the circumferential direction about the centerline O1 becomes smaller correspondingly. Therefore, when the hinge pin 70 rotates in the direction of rotation for unlocking in association with a release operation of the release lever 76, the hinge pin 70 pushes the two inner side surfaces 66a of the fitting hole 66 by the two flat surfaces 71a of the fitting shaft portion 71, whereby the cam 42 immediately rotates in the direction of rotation for unlocking. Accordingly, a lag between rotation start timing of the hinge pin 70 in association with the release operation of the release lever 76 and release timing for releasing the engagement between the inner teeth 33 of the second bracket 31 and the outer teeth 54 (and the outer teeth 57 of the both second poles 41B) of the first pole 41A in association with the rotation of the cam 42 (and the release plate 43) (that is, an operation loss) may be reduced.

When the release lever 76 is released, the release lever 76 is urged by the tension coil spring 82 and is restored to its original position together with the hinge pin 70. Simultaneously, the cam 42 urged by the helical spring 44 is rotated in the direction of rotation for locking together with the release plate 43, so that the first pole 41A and the second poles 41B move radially outward and the rotation of the recliner 20 is disabled.

As illustrated in FIG. 1, the left and right release levers 76 arranged corresponding to the both recliners 20 are coupled to a release operation lever 5 which is rotatably coupled to an upper end portion of the seatback 3, for example, via a double-tube type cable 6. In other words, the cable 6 extends toward both of the recliners 20 by being bifurcated on the lower side to both sides of the seat in the seat width direction, and a terminal of an outer cable 6a on the side of the release operation lever 5 is fixed to the seatback 3 side and both terminals thereof on the recliners 20 side are fixed to the left and right supporting brackets 81 (the supporting strips 81b). A terminal of an inner cable 6b of the cable 6 on the side of the release operation lever 5 is coupled to the release operation lever 5 and both terminals on the side of the recliners 20 project from the terminal of the outer cable 6a fixed to the supporting brackets 81 (supporting strips 81b) and are coupled to the release levers 76 (the locking holes 78a).

Therefore, when the release operation lever 5 is operated (rotated), the release levers 76 on both sides of the seat in the seat width direction are simultaneously released via the cable 6. At this time, the cams 42 of the both recliners 20 rotate in the direction of rotation for unlocking together with the both hinge pins 70 as described above.

Subsequently, the operation in the first embodiment will be described.

When the release operation lever 5 is operated, the release levers 76 on both sides of the seat in the seat width direction are simultaneously released via the cable 6, and the cams 42 of the both recliners 20 and the release plates 43 rotate in the direction of rotation for unlocking together with the both hinge pins 70. At this time, the first pole 41A and the both second poles 41B of the respective recliners 20 move radially inward, and the first and second brackets 21 and 31 are brought into a state of being free to rotate with respect each other, so that adjustment of the angle of inclination of the seatback 3 with respect to the seat cushion 2 is allowed.

In particular, each of the hinge pins 70 presses the two inner side surfaces 66a of the fitting hole 66 by the two flat surfaces 71a of the fitting shaft portion 71 having a small gap with respect to the fitting hole 66, so that the cam 42 and the like are rotated quickly, and the above-described operation loss is reduced.

Subsequently, when the release operation lever 5 is released, the release operations of the release levers 76 on the both sides of the seat in the seat width direction are released simultaneously, and the both release levers 76 urged by the tension coil spring 82 are restored to the original position together with the hinge pin 70. Simultaneously, the cams 42 and the release plates 43 of the both recliners 20 are urged by the helical springs 44 and rotate in the direction of rotation for locking. At this time, the first pole 41A and the both second poles 41B of the respective recliners 20 move radially outward and the first and second brackets 21 and 31 are brought into a state of incapable of rotating with respect to each other, so that the seatback 3 is held at the angle of inclination at that time.

As described above in detail, advantages as shown below are achieved according to the embodiment disclosed here.

(1) According to the embodiment disclosed here, the release lever 76 is urged by the tension coil spring 82 along the radial direction on the side where the gap between the fitting shaft portion 71 and the fitting hole 66 is larger together with the hinge pin 70. Therefore, by absorbing the inclination of the axial line of the hinge pin 70 in the radial direction on the side where the gap between the fitting shaft portion 71 and the fitting hole 66 is larger in advance, the axial line of the cam 42 is prevented from being inclined with the hinge pin 70. Accordingly, the rotation of the cam 42 and the release plate 43 and the advancement or the retraction of the first and second poles 41A and 41B in association therewith are smoothened, the operation when restricting or allowing the relative rotation of the first and second brackets 21 and 31, that is, the operation when restricting or allowing the rotation of the seatback 3 with respect to the seat cushion 2 can further be stabilized. In contrast, in the radial direction on the side where the gap with respect to the fitting hole 66 is smaller (that is, the radial direction orthogonal to the radial direction on the side where the gap between the shaft portion 72 and the fitting hole 66 is larger), the play in the circumferential direction about the centerline O1 becomes smaller correspondingly. Therefore, the lag between rotation start timing of the hinge pin 70 in association with the release operation of the release lever 76 and release timing for releasing the engagement between the inner teeth 33 of the second bracket 31 and the outer teeth 54 and 57 of the first and second poles 41A and 41B in association with the rotation of the cam 42 and the release plate 43 (that is, the operation loss) may be reduced, and hence deterioration of an operation feeling is restrained.

(2) In the embodiment disclosed herein, since the two inner side surfaces 66a of the fitting hole 66 are pressed by the two flat surfaces 71a of the fitting shaft portion 71 of the hinge pin 70 when the rotation is transmitted to the cam 42, a load generated therebetween may be dispersed to the entire surfaces. When the rotation is transmitted to the cam 42, concentration of the load on a part between the fitting shaft portion 71 and the fitting hole 66 may be restrained, and hence the strength of transmission of the rotation with respect to the cam 42 may be increased.

(3) In the embodiment disclosed herein, the fitting shaft portion 71 has so-called a substantially oval shape in cross section formed by the two flat surfaces 71a and a pair of the arcuate surfaces 71b. Therefore, in comparison with a case where the fitting shaft portion 71 is formed into a substantially polygonal shape in cross section (for example, hexagonal shape) including two flat surfaces, a large surface area (the length of the both flat surfaces in the cross-sectional shape) may be secured for the two flat surfaces 71a and the strength of the transmission of the rotation with respect to the cam 42 may further be increased.

(4) In the embodiment disclosed herein, the urging force of the hinge pin 70 along the radial direction in which the two arcuate surfaces 71b of the fitting shaft portion 71 face acts linearly by the tension coil spring 82. Therefore, in comparison with a torsion spring or the like, the setting of the urging direction is easily achieved. Since the leg portion 82a of the tension coil spring 82 is locked to the distal end portion of the release lever 76 (that is, a position apart in the radial direction with respect to the centerline O1 at the center), the urging direction of the tension coil spring 82 may be set further accurately, and a posture of the release lever 76 (and the hinge pin 70) may further be stabilized.

(5) In the embodiment disclosed herein, the relative rotation between the first and second brackets 21 and 31, that is, the rotation of the seatback 3 with respect to the seat cushion 2 may be allowed by performing the release operation of the release lever 76 through the operation of the release operation lever 5 via the cable 6. In this manner, since the seatback 3 may be made rotatable with respect to the seat cushion 2 by an input of operation with respect to the release operation lever 5, arrangement flexibility of an operation input position may be increased.

(6) In the embodiment disclosed herein, since the release operation of the release levers 76 on both side of the seat in the seat width direction via the cable 6 may be performed simultaneously by operating the release operation lever 5, operability may be improved in comparison with the case where the release levers 76 on the both sides of the seat in the seat width direction are released individually.

(7) In the embodiment disclosed herein, since the inclination of the axial line of the hinge pin 70 is restrained, provision of a bearing for axially supporting the distal end portion of the hinge pin 70 (the fitting shaft portion 71) projecting outward from the seat cushion side frame 2a is not necessary.

The embodiment may be changed as follows.

Figure 7:
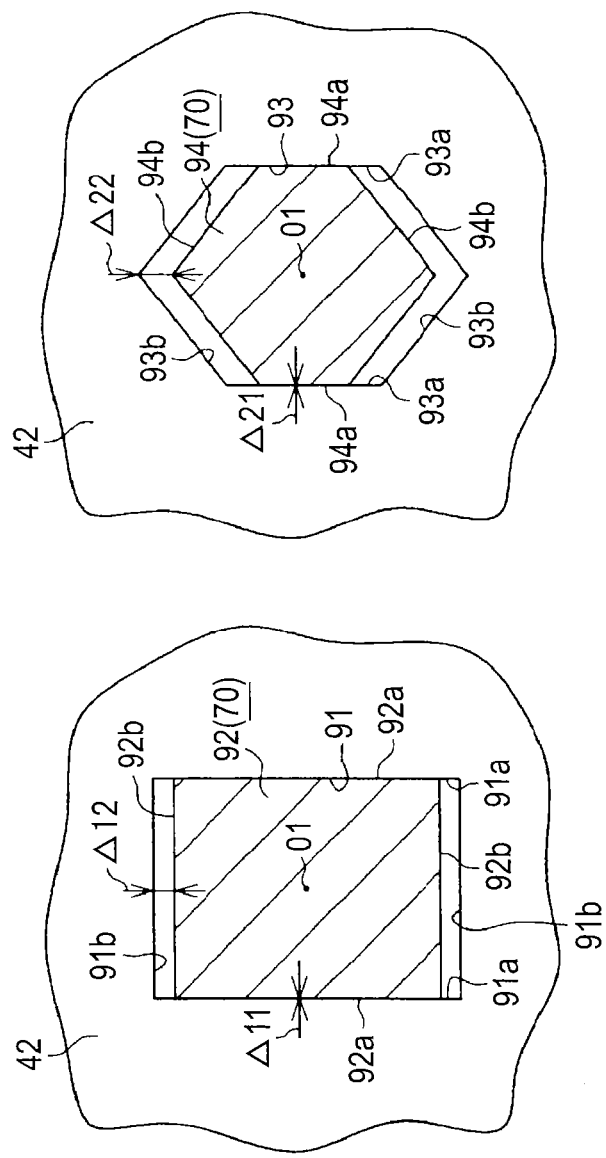
FIG. 7A and FIG. 7B are explanatory drawings illustrating modifications of the embodiment disclosed here.
Figure 8:
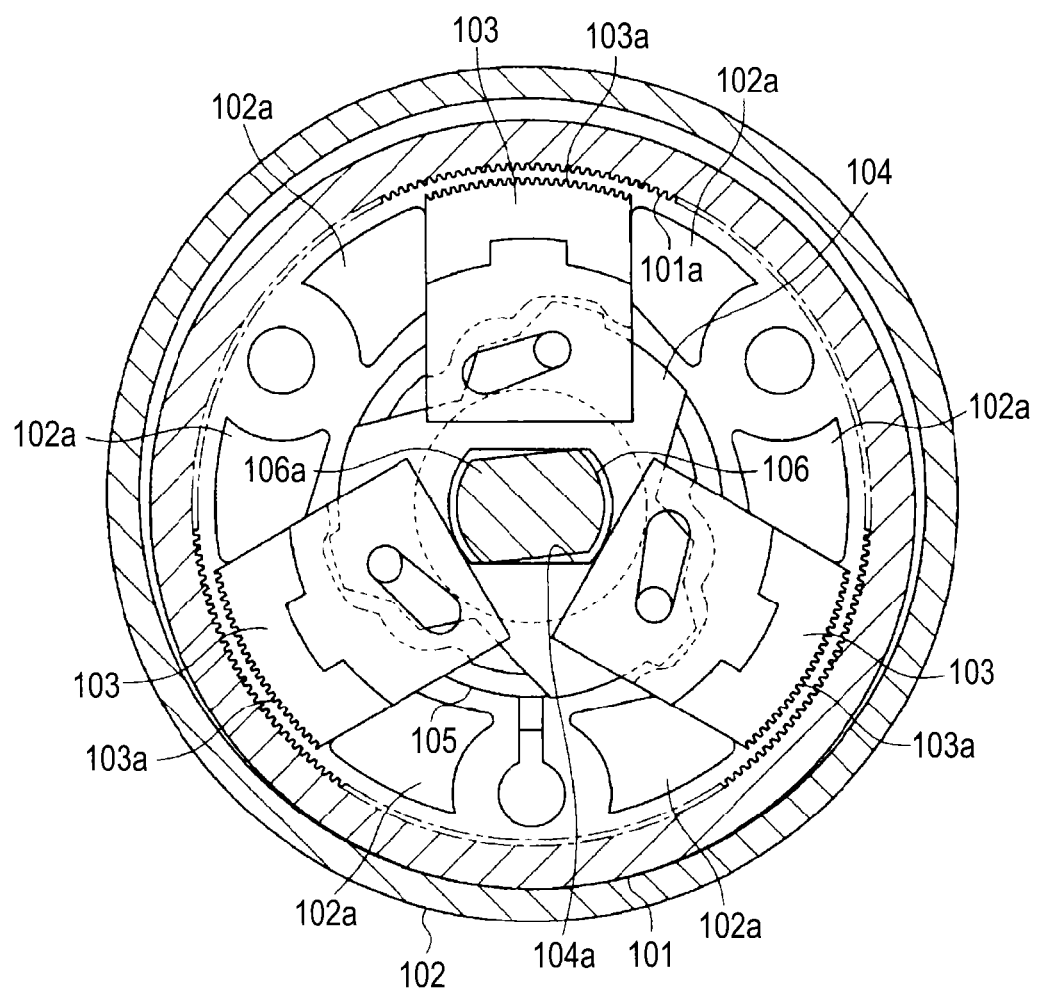
FIG. 8 is a lateral cross-section illustrating a mode of a related art.

As illustrated in FIG. 7A, it is also possible to form a substantially rectangular-shaped fitting hole 91 in the cam 42 and form a fitting shaft portion 92 of the hinge pin 70 to be inserted through the fitting hole 91 into a substantially rectangular shape in cross-section. In this case, the fitting shaft portion 92 having a substantially rectangular shape in cross-section is formed by two flat surfaces 92a parallel to each other facing in the radial direction with respect to the centerline O1 at the center and, in the same manner, a pair of flat surfaces 92b parallel to each other and connecting the two flat surfaces 92a facing in the radial direction with respect to the centerline O1 at the center. In contrast, the substantially rectangular-shaped fitting hole 91 is defined by two inner side surfaces 91a parallel to each other facing the two flat surfaces 92a of the fitting shaft portion 92 in the radial direction with respect to the centerline O1 at the center, and a pair of inner side surfaces 91b also parallel to each other and facing each other in the radial direction with respect to the centerline O1 at the center and coupling the two inner side surfaces 91a. In other words, the radial direction in which the both flat surfaces 92a face each other and the radial direction in which both flat surfaces 92b face each other are orthogonal to each other and, in the same manner, the radial direction in which the both inner side surfaces 91a face each other and the radial direction in which the both inner surfaces 91b face each other are orthogonal to each other.

A gap Δ11 with respect to the fitting hole 91 in the radial direction in which the two flat surfaces 92a of the fitting shaft portion 92 face each other (that is, the gap Δ11 between the flat surfaces 92a and the inner side surfaces 91a adjacent to each other in the radial direction) is set to be smaller than a gap Δ12 with respect to the fitting hole 91 in a radial direction orthogonal to the radial direction described above (that is, the gap Δ12 between the flat surfaces 92b and the inner side surfaces 91b adjacent to each other in the radial direction). In this case, the tension coil spring 82 may urge the hinge pin 70 along the radial direction in which the two flat surfaces 92b of the fitting shaft portion 92 face via the release lever 76.

As illustrated in FIG. 7B, it is also possible to form a substantially hexagonal-shaped fitting hole 93 in the cam 42 and form a fitting shaft portion 94 of the hinge pin 70 to be inserted through the fitting hole 93 into a substantially hexagonal shape in cross-section. In this case, the fitting shaft portion 94 having a substantially hexagonal shape in cross-section is formed by two flat surfaces 94a parallel to each other facing in the radial direction with respect to the centerline O1 at the center and, in the same manner, a pair of crest surfaces 94b connecting the two flat surfaces 94a facing in the radial direction with respect to the centerline O1 at the center. In contrast, the substantially hexagonal-shaped fitting hole 93 is defined by two inner side surfaces 93a parallel to each other facing the two flat surfaces 94a of the fitting shaft portion 94 in the radial direction with respect to the centerline O1 at the center, and a pair of trough-shaped surfaces 93b also facing each other in the radial direction with respect to the centerline O1 at the center and coupling the two inner side surfaces 93a. In other words, the radial direction in which the both flat surfaces 94a face each other and the radial direction in which the both crest surfaces 94b face each other are orthogonal to each other and the radial direction in which the both inner side surfaces 93a face each other and, in the same manner, the radial direction in which the both trough-shaped surfaces 93b face each other are orthogonal to each other.

A gap Δ21 with respect to the fitting hole 93 in the radial direction in which the two flat surfaces 94a of the fitting shaft portion 94 face each other (that is, the gap Δ21 between the flat surfaces 94a and the inner side surfaces 93a adjacent to each other in the radial direction) is set to be smaller than a gap Δ22 with respect to the fitting hole 93 in a radial direction orthogonal to the radial direction described above (that is, the gap Δ22 between the crest surfaces 94b and the trough-shaped surfaces 93b adjacent to each other in the radial direction). In this case, the tension coil spring 82 may urge the hinge pin 70 along the radial direction in which the two crest surfaces 94b of the fitting shaft portion 94 face via the release lever 76.

The gap Δ21 with respect to the fitting hole 93 in the radial direction in which the two flat surfaces 94a of the fitting shaft portion 94 face each other (that is, the gap Δ21 between the flat surfaces 94a and the inner side surfaces 93a adjacent to each other in the radial direction) may be set to be larger than the gap Δ22 with respect to the fitting hole 93 in a radial direction orthogonal to the radial direction described above (that is, the gap Δ22 between the crest surfaces 94b and the trough-shaped surfaces 93b adjacent to each other in the radial direction). In this case, the tension coil spring 82 may urge the hinge pin 70 along the radial direction in which the two flat surfaces 94a of the fitting shaft portion 94 face via the release lever 76.

In the embodiment disclosed here, a torsion spring (for example, helical spring) may be employed as a supporting urging member instead of the tension coil spring 82. In the embodiment disclosed here, the recliners 20 are provided on the both sides. However, a configuration in which the recliner 20 is provided only on one side and a simple bearing structure is provided on the opposite side is also applicable. In this case, the release operation lever 5 and the release lever 76 may be coupled with a single cable, which is not bifurcated. Alternatively, a configuration in which the release operation lever 5 and the cable are omitted and the release lever 76 is configured to allow the seating person or the like to release directly is also applicable.

In the embodiment disclosed here, the number of poles (41A, 41B) to be disposed in the first bracket 21 is arbitrary. When a plurality of poles are disposed, these poles may have different shapes or may be the same shape as long as actions thereof are interlocked. In particular, when all of the poles are formed to have the same shape as the first pole 41A, the release plate 43 may be omitted.

In the embodiment disclosed here, a fixed relationship of the first bracket 21 and the second bracket 31 with respect to the seat cushion 2 (the seat cushion side frame 2a) and the seatback 3 (the seatback side frames 3a) may be opposite.

According to a first aspect of this disclosure, there is provided a vehicle seat reclining apparatus including: a first bracket to be fixed to either one of a seat cushion side and a seatback side; a second bracket fixed to the other one of the seat cushion side and the seatback side, and configured to allow adjustment of an angle of inclination of the seatback with respect to the seat cushion in association with a relative rotation with respect to the first bracket; a pole having outer teeth engageable and disengageable with respect to inner teeth provided on the second bracket and configured to be guided by a guide wall provided on the first bracket so as to move in the radial direction thereof; a cam engaged with the pole and rotatably provided on the first bracket; a locking urging member configured to urge the cam to rotate to cause the outer teeth and the inner teeth to be engaged each other; a hinge pin having a fitting shaft portion including two flat surfaces facing each other in the radial direction with respect to an axial line at the center of the first and second brackets and parallel to each other and being axially supported by the second bracket; and a fitting hole formed at a center portion of the cam, having two inner side surfaces parallel to each other and facing the two flat surfaces of the fitting shaft portion in the radial direction with respect to the axial line at the center, and allowing insertion of the fitting shaft portion, the fitting hole being set to have a smaller gap with respect to the fitting shaft portion in one of a radial direction in which the two flat surfaces face each other and a radial direction orthogonal to the radial direction in which the two flat surfaces face each other than a gap between the fitting shaft portion and the fitting hole in the other one of the two radial directions; a release lever coupled to the hinge pin so as to rotate integrally therewith; and a supporting urging member locked to the release lever at one leg portion thereof and locked to the seat cushion side or the seatback side where the first bracket is fixed at the other leg portion thereof, and configured to urge the release lever along the radial direction on the side having the larger gap between the fitting shaft portion and the fitting hole.

In this configuration, the release lever is urged by the supporting urging member along the radial direction on the side where the gap between the fitting shaft portion and the fitting hole is larger together with the hinge pin. Therefore, by absorbing an inclination of an axial line of the hinge pin on the side where the gap between the fitting shaft portion and the fitting hole is larger in the radial direction in advance, an axial line of the cam is prevented from being inclined with the hinge pin. Accordingly, the rotation of the cam and advancement and retraction of the poles associated therewith are smoothened, and an operation when restricting or allowing the relative rotation of the first and second brackets, that is, an operation when restricting or allowing the rotation of the seatback with respect to the seat cushion is further stabilized. In contrast, in the radial direction on the side where the gap with respect to the fitting hole is smaller (that is, the radial direction orthogonal to the radial direction on the side where the gap between the fitting shaft portion and the fitting hole is larger), a play in the circumferential direction about the axial line becomes smaller correspondingly. Therefore, a lag between rotation start timing of the hinge pin in association with the release operation of the release lever and release timing for releasing the engagement between the inner teeth of the second bracket and the outer teeth of the poles in association with the rotation of the cam (that is, an operation loss) may be reduced, and hence deterioration of an operation feeling is restrained.

The term, "urges along the radial direction on the side where the gap between the fitting shaft portion and the fitting hole is larger" does not mean that the urging direction of the supporting urging member matches the radial direction on the side where the gap between the fitting shaft portion and the fitting hole is larger. It is essential that the urging direction of the supporting urging member is dominant in the radial direction in which the gap between the fitting shaft portion and the fitting hole is larger.

According to a second aspect of this closure, the gap between the fitting shaft portion and the fitting hole in the radial direction in which the two flat surfaces face each other is set to be smaller than the gap in the radial direction orthogonal to the radial direction in which the two flat surfaces face each other, and the hinge pin presses the two inner side surfaces of the fitting hole by the two flat surfaces of the fitting shaft portion thereof to transmit a rotation thereof to the cam.

In this configuration, since the two inner side surfaces of the fitting hole are pressed by the two flat surfaces of the fitting shaft portion of the hinge pin when the rotation is transmitted to the cam, a load generated therebetween may be dispersed to the entire surfaces. When the rotation is transmitted to the cam, concentration of the load on a part between the fitting shaft portion and the fitting hole may be restrained, and hence the strength of transmission of the rotation with respect to the cam may be increased.

According to a third aspect of this closure, the fitting shaft portion is defined by the two flat surfaces and a pair of arcuate surfaces facing each other in the radial direction with respect to the axial line at the center and connecting the two flat surfaces.

In this configuration, the fitting shaft portion has so-called a substantially oval shape in cross section formed by the two flat surfaces and the pair of the arcuate surfaces. Therefore, in comparison with a case where the fitting shaft portion is formed into a substantially polygonal shape in cross section (for example, hexagonal shape) including two flat surfaces, a large surface area of the two flat surfaces (the length of the both flat surfaces in the cross-sectional shape) may be secured and the strength of the transmission of the rotation with respect to the cam may further be increased.

According to a fourth aspect of this closure, the supporting urging member is a tension coil spring locked at the leg portion thereof to a distal end portion of the release lever.

In this configuration, since the supporting urging member is the tensile coil spring, an urging force of the supporting urging member along the radial direction in which the gap between the fitting shaft portion and the fitting hole is larger acts linearly. Therefore, in comparison with a torsion spring or the like, the setting of the urging direction of the supporting urging member is easily achieved. Since the leg portion of the supporting urging member is locked to the distal end portion of the release lever (that is, a position radially apart from the axial line as the center), the urging direction of the supporting urging member may be set further accurately, and a posture of the release lever (and the hinge pin) may further be stabilized.

According to a fifth aspect of this closure, the first bracket and the second bracket are fixed respectively to the seat cushion side and the seatback side, and a cable being connected at one terminal thereof to a release operation lever provided on the seatback side is coupled to the release lever at the other terminal thereof.

In this configuration, the relative rotation between the first and second brackets, that is, the rotation of the seatback with respect to the seat cushion may be allowed by performing the release operation of the release lever through the operation of the release operation lever via the cable. In this manner, since the seatback may be made rotatable with respect to the seat cushion by an input of operation with respect to the release operation lever, arrangement flexibility of an operation input position may be increased.

According to a sixth aspect of this closure, a pair of sets of the first bracket, the second bracket, the pole, the cam, the locking urging member, the hinge pin and the release lever are provided on both sides of the seat in the seat width direction, and the cable is coupled to the release levers provided on the seat on the both sides in the seat width direction at a pair of the terminals bifurcated to the both sides of the seat in the seat width direction.

In this configuration, since the release operation of the release levers on both side of the seat in the seat width direction via the cable may be performed simultaneously by operating the release operation lever, operability may be improved in comparison with the case where the release levers on the both sides of the seat in the seat width direction are released individually.

According to this disclosure, there is provided the vehicle seat reclining apparatus which achieves further stabilization of the operations when restricting or allowing the rotation of the seatback with respect to the seat cushion and restraint of deterioration of the operation feeling when the restriction is released.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly it is expressly intended that all such variations, changes and equivalents which fall within the spirit and scope of the present invention as defined in the claims, be embraced thereby.

What is claimed is:

1. A vehicle seat reclining apparatus comprising:
a first bracket to be fixed to either one of a seat cushion side and a seatback side;
a second bracket fixed to the other one of the seat cushion side and the seatback side, and configured to allow adjustment of an angle of inclination of the seatback with respect to the seat cushion in association with a relative rotation with respect to the first bracket;
a pole having outer teeth engageable and disengageable with respect to inner teeth provided on the second bracket and configured to be guided by a guide wall provided on the first bracket so as to move in the radial direction thereof;
a cam engaged with the pole and rotatably provided on the first bracket;
a locking urging member configured to urge the cam to rotate to cause the outer teeth and the inner teeth to be engaged each other;
a hinge pin having a fitting shaft portion including two flat surfaces facing each other in the radial direction with respect to an axial line at the center of the first and second brackets and parallel to each other and being axially supported by the second bracket; and
a fitting hole formed at a center portion of the cam, having two inner side surfaces parallel to each other and facing the two flat surfaces of the fitting shaft portion in the radial direction with respect to the axial line at the center, and allowing insertion of the fitting shaft portion, the fitting hole being set to have a smaller gap with respect to the fitting shaft portion in one of a first radial direction in which the two flat surfaces face each other and a second radial direction orthogonal to the first radial direction than a gap between the fitting shaft portion and the fitting hole in the other one of the first radial direction and the second radial direction;
a release lever coupled to the hinge pin so as to rotate integrally therewith; and
a supporting urging member locked to the release lever at one leg portion thereof and locked to the seat cushion side or the seatback side where the first bracket is fixed at the other leg portion, and configured to urge the release lever along the radial direction on the side having the larger gap between the fitting shaft portion and the fitting hole.

2. The vehicle seat reclining apparatus according to claim 1, wherein
the gap between the fitting shaft portion and the fitting hole in the first radial direction is set to be smaller than the gap in the second radial direction, and
the hinge pin presses the two inner side surfaces of the fitting hole by the two flat surfaces of the fitting shaft portion thereof to transmit a rotation thereof to the cam.

3. The vehicle seat reclining apparatus according to claim 2, wherein
the fitting shaft portion is defined by the two flat surfaces and a pair of arcuate surfaces facing each other in the radial direction with respect to the axial line at the center and connecting the two flat surfaces.

4. The vehicle seat reclining apparatus according to claim 1, wherein
the supporting urging member is a tension coil spring locked at the leg portion thereof to a distal end portion of the release lever.

5. The vehicle seat reclining apparatus according to claim 1, wherein
the first bracket and the second bracket are fixed respectively to the seat cushion side and the seatback side, and
a cable being connected at one terminal thereof to a release operation lever provided on the seatback side is coupled to the release lever at the other terminal thereof.

6. The vehicle seat reclining apparatus according to claim 5, wherein
a pair of sets of the first bracket, the second bracket, the pole, the cam, the locking urging member, the hinge pin and the release lever are provided on both sides of the seat in the seat width direction, and
the cable is coupled to the release levers provided on the seat on the both sides in the seat width direction at a pair of the terminals bifurcated to the both sides of the seat in the seat width direction.

* * * * *